(12) United States Patent
Wasiutinski et al.

(10) Patent No.: US 12,299,459 B2
(45) Date of Patent: May 13, 2025

(54) PIPELINE CONFIGURATION SUPPORT

(71) Applicant: SAP SE, Walldorf (DE)

(72) Inventors: Vladimir Wasiutinski, Dresden (DE); Roberto Usberti Filho, Heddesheim (DE)

(73) Assignee: SAP SE, Walldorf (DE)

( * ) Notice: Subject to any disclaimer, the term of this patent is extended or adjusted under 35 U.S.C. 154(b) by 92 days.

(21) Appl. No.: 18/367,744

(22) Filed: Sep. 13, 2023

(65) Prior Publication Data

US 2025/0085982 A1    Mar. 13, 2025

(51) Int. Cl.
*G06F 9/445* (2018.01)

(52) U.S. Cl.
CPC ................ *G06F 9/44505* (2013.01)

(58) Field of Classification Search
CPC .................................................. G06F 9/44504
USPC ......................................................... 713/100
See application file for complete search history.

(56) References Cited

U.S. PATENT DOCUMENTS

| | | | | |
|---|---|---|---|---|
| 6,310,889 | B1* | 10/2001 | Parsons | H04L 41/00 455/433 |
| 6,694,321 | B1* | 2/2004 | Berno | G06F 16/252 |
| 2008/0065648 | A1* | 3/2008 | Gupta | G06F 16/27 |
| 2008/0235710 | A1* | 9/2008 | Challenger | G06F 9/5027 719/316 |
| 2012/0005236 | A1* | 1/2012 | Deng | G06F 8/10 707/E17.011 |
| 2014/0137110 | A1* | 5/2014 | Engle | G06F 9/5022 718/1 |
| 2016/0308912 | A1* | 10/2016 | Mulgaonkar | H04L 63/205 |
| 2020/0387417 | A1* | 12/2020 | Wang | G06F 16/2365 |
| 2022/0019400 | A1* | 1/2022 | Law | H04R 5/04 |
| 2023/0267211 | A1* | 8/2023 | Hussmann | G06F 21/57 726/22 |

\* cited by examiner

*Primary Examiner* — Paul R. Myers
(74) *Attorney, Agent, or Firm* — SCHWEGMAN LUNDBERG & WOESSNER, P.A.

(57) ABSTRACT

Data processing tools often use pipeline-based workflows, which consist of a sequence of operations. Each operation is configured according to configuration settings provided by a pipeline developer. The operations may use other software components such as frameworks that may also be configured. An application developer that defines a series of operations to be performed to achieve a desired result is able to provide the configuration settings for the operations. However, the application developer may not have the expertise to efficiently define configuration settings for the underlying frameworks. As discussed herein, a pipeline configuration system is used to generate configuration settings for frameworks used by a pipeline based on configuration settings for the operations of the pipeline. The operation configuration may include non-transformable properties, transformable properties, and internal properties. The pipeline configuration system may primarily modify the transformable properties.

20 Claims, 11 Drawing Sheets

PIPELINE CONFIGURATION SUPPORT

TECHNICAL FIELD

The subject matter disclosed herein generally relates to pipeline-based workflows for data processing. Specifically, the present disclosure addresses systems and methods to provide pipeline configuration support.

BACKGROUND

Data processing tools often use pipeline-based workflows, which consist of a sequence of single operations like data load, transformation, and computation operations. Each operation requires certain configuration settings that must be set by the pipeline developer. Often the operations make use of other frameworks with underlying settings that also must be configured. For example, the amount of memory or number of cores used by each framework may be configurable.

A developer of an operation can be overwhelmed with the configuration options for the underlying frameworks. Nonetheless, the underlying frameworks must be configured properly to achieve performance and cost targets.

DETAILED DESCRIPTION

Figure 1:
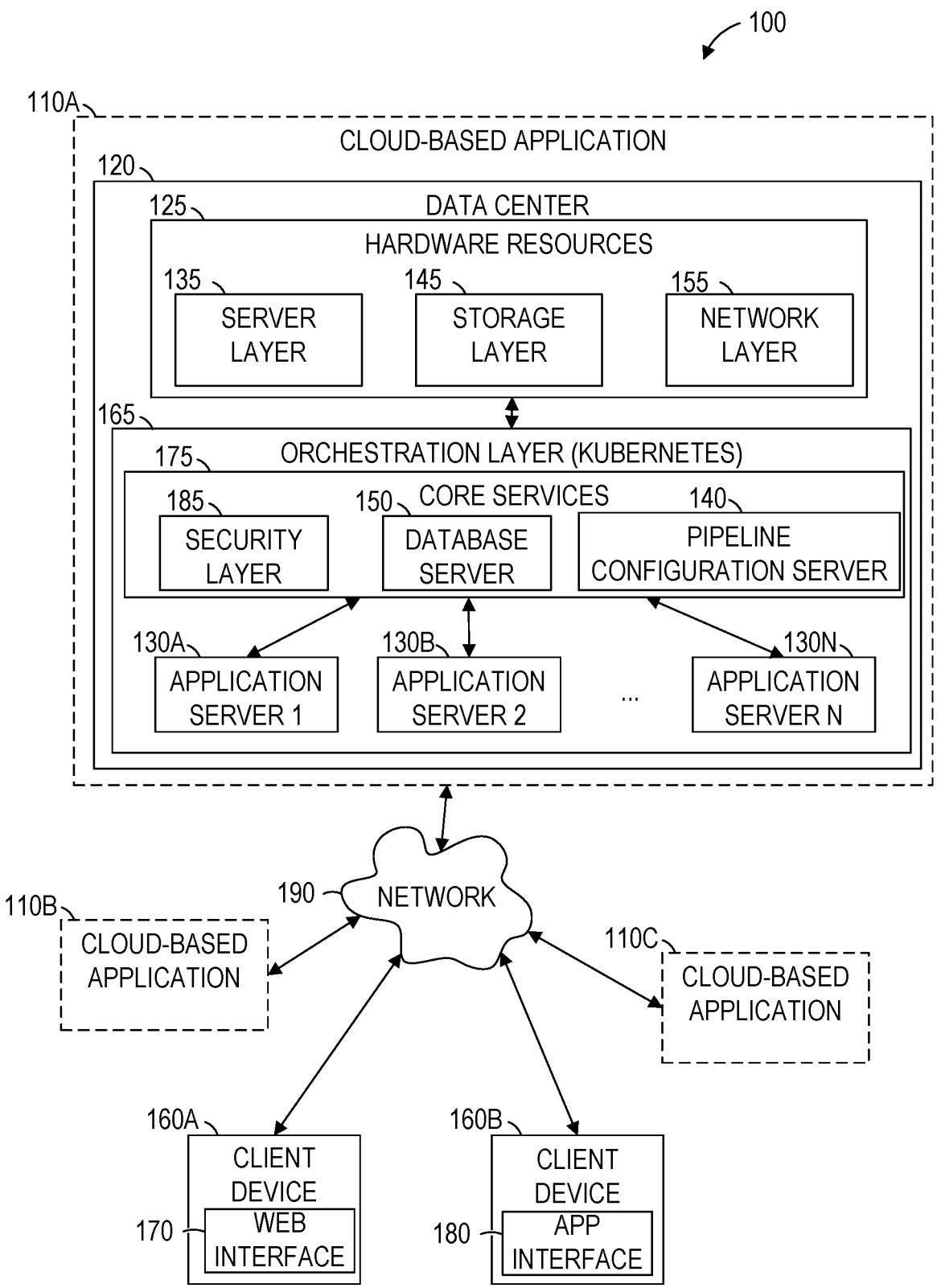
FIG. 1 is a network diagram illustrating an example network environment suitable for pipeline configuration support.

Example methods and systems are directed to automatically configuring pipeline-based workflows. Data processing tools often use pipeline-based workflows, which consist of a sequence of operations (e.g., data load, data transformation, computation operations, or any suitable combination thereof). Each operation is configured according to configuration settings provided by a pipeline developer. The operations may use other software components such as frameworks, services, libraries, and the like (referred to generically as "frameworks" herein). The frameworks may also be configured. For example, an operation may be configured to read data from a certain source using a data-accessing framework. The data-accessing framework may be configured to provide a certain number of processor cores to the operation.

An application developer that defines a series of operations to be performed to achieve a desired result is able to provide the configuration settings for the operations. However, the application developer may not have the expertise to efficiently define configuration settings for the underlying frameworks.

As discussed herein, a trained machine-learning model is used to generate configuration settings for frameworks used by a pipeline based on configuration settings for the operations of the pipeline. The operation configuration may include non-transformable properties, transformable properties, and internal properties. Non-transformable properties are properties that remain unchanged and keep the values provided by the application developer. For example, credentials used to access a database and the identification of the database itself are non-transformable properties. Transformable properties are properties that may be modified for optimization. For example, two database access commands may be logically equivalent but not equally efficient to execute. If the system determines that the equivalent command is more efficient than the developer-provided command, the command may be transformed to improve efficiency. Internal properties are properties that affect the framework, the framework configuration, or both, but do not affect the data manipulation performed by the operation. For example, a framework may be configured to use a selectable number of processor cores. If more processor cores are used, the operation using the framework may complete in less time. However, the data accessed, the data output, and the manipulations performed by the operation do not change depending on the number of processor cores used.

In an initial configuration phase, an administrator may set default values for internal properties for all frameworks. The default values will be applied for all pipelines unless overridden. The application developer may set values for transformable and non-transformable properties while designing a pipeline. Additional properties may be determined when a user of the pipeline initiates execution of the pipeline. For example, the pipeline may transform raw financial data into a profit and loss statement for a selectable period of time. The user may select the period of time, which modifies the data accessed and processed by the particular execution of the pipeline by modifying transformable or non-transformable properties.

In a pipeline deployment phase, the operation configurations are sent to a runtime system for execution. As discussed herein, the operation configurations are provided to a transformation service that adds or modifies transformable and internal properties. Thus, the default values for the internal properties for the frameworks may be modified based on the operation configurations provided by the application developer, improving performance, reducing cost, or both.

The results generated using different framework configurations may be monitored to provide feedback to a machine-learning model used in the pipeline deployment phase. Thus, over time, the efficacy of the machine-learning model is improved.

Using the systems and methods described herein, efforts involved in configuring frameworks are reduced and the effectiveness of the frameworks is increased. Improving the effectiveness of the frameworks decreases the delay in generating results, decreases the cost of generating results, decreases energy consumption by processors and other devices in generating the results, or any suitable combination thereof.

FIG. 1 is a network diagram illustrating an example network environment 100 suitable for pipeline configuration support. The network environment 100 includes the cloud-based applications 110A, 110B, and 110C, client devices 160A and 160B, and a network 190. The cloud-based application 110A is shown in greater detail than the cloud-based applications 110B and 110C, which may use similar infrastructure.

The cloud is an ecosystem of applications, core services (e.g., database and security), the infrastructure that supports the applications and core services, and an orchestration system that virtualizes and separates the software from the hardware in a configurable way. Cloud applications, such as the cloud-based applications 110A-110C, can easily be harnessed by other applications to provide additional value and services by reusing existing services and functionalities.

The cloud-based application 110A may be implemented using one or more data centers, such as the data center 120. A data center is a physical edifice that hosts the hardware infrastructure of computer systems and the related software that manages the hardware infrastructure. The data center hosts, runs, and manages all the software services executed by the hardware infrastructure. The software services can be managed through automation, APIs, manually, or any suitable combination thereof.

The hardware resources 125 of the data center 120 are the hardware resources used by the data center 120 to execute software and provide related services. The hardware resources 125 may make use of hardware virtualization software to transform the available hardware into logical units that are commercialized as a service. The logical units may include a server layer 135, a storage layer 145, and a network layer 155.

The server layer 135 includes hardware for computing, including server racks, blades, bare-metal computers, mainframes, or any other hardware that provides CPU and memory. The server layer 135 may also include storage to host operating system (OS) and other infrastructure software systems.

The storage layer 145 includes one or more types of storage, each with their own set of qualities and costs. The storage devices used by the storage layer 145 may include solid-state drives (SSDs), Non-Volatile Memory Express (NVMe) devices, and hard disk drives (HDDs). The storage devices may also be virtualized and sold or rented in logical units.

The network layer 155 includes the hardware and software that build and manage the data center 120's internal network and its connectivity with the network 190. The components of the network layer 155 may include switches, routers, firewalls, gateways, load balancers, network-attached storage (NAS) servers, address translators (e.g., providing network address translation (NAT), port address translation (PAT), or both), or any suitable combination thereof. The network resources may also be virtualized and sold or rented in logical units.

The orchestration layer 165 consumes the virtualized hardware resources 125 to build logical clusters that execute the core services and applications. The orchestration layer 165 facilitates and automates the deployment of the core services and applications as well as the distribution of compute and storage resources. The orchestration layer 165 may also configure the network and security of the cluster, services, and resources.

Software services that help the development of new applications by providing common functionality are provided by the core services 175. The core services 175 may also help harmonize the usage of services and the integration of different applications. The core services 175 include a pipeline configuration server 140, a database server 150, and a security layer 185.

The security layer 185 comprises software systems that provide security to applications. For example, certificate providers, authentication systems, and authorization systems may be part of the security layer 185.

The application servers 130A, 130B, . . . 130N communicate with the database server 150 and the pipeline configuration server 140. The application servers 130A-130N access application data (e.g., application data stored by the database server 150) to provide one or more applications to the client devices 160A and 160B via a web interface 170 or an application interface 180. The client devices 160A and 160B may be referred to generically as a client device 160 or in the aggregate as client devices 160. Similarly, the application servers 130A, 130B, . . . , 130N may be referred to generically as an application server 130 or in the aggregate as application servers 130.

An application developer provides configuration data for one or more operations of a pipeline. The pipeline configuration server 140, based on the operation configuration data, generates framework configuration data. The data center 120 uses the generated framework configuration data to allocate resources to the frameworks underlying the operations of the pipeline. For example, one or more of the application servers 130, or resources of the application servers 130, may be allocated to the pipeline.

The application servers 130, the database server 150, the pipeline configuration server 140, and the client devices 160A and 160B may each be implemented in a computer system, in whole or in part, as described below with respect to FIG. 11. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application servers 130, the database server 150, the pipeline configuration server 140, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one data center 120, one network-based application 110, two application servers 130, two client devices 160, and the like), any number of each element is contemplated. For example, the database server 150 may include dozens or hundreds of active and standby servers and provide data to multiple data centers 120 that provide applications to millions of client devices. Likewise, each application server 130 may access data from multiple database servers 150, and so on.

Figure 2:
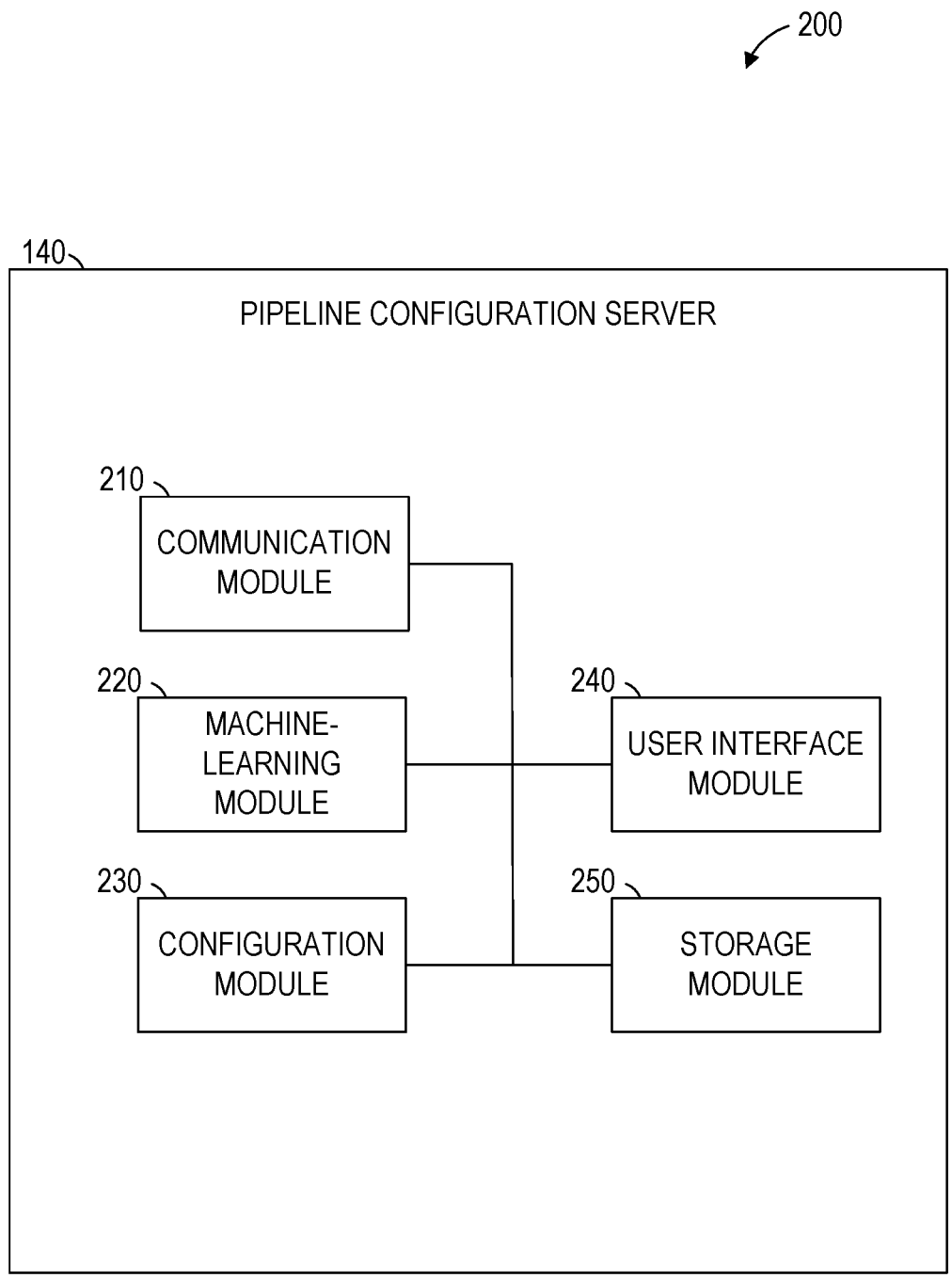
FIG. 2 is a block diagram of a pipeline configuration server suitable for pipeline configuration support, according to some example embodiments.

FIG. 2 is a block diagram 200 of the pipeline configuration server 140 suitable for pipeline configuration support, according to some example embodiments. The pipeline configuration server 140 is shown as including a communication module 210, a machine-learning module 220, a configuration module 230, a user interface module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the pipeline configuration server 140 and transmits data from the pipeline configuration server 140. For example, the communication module 210 may receive, from application server 130A or the client device 160A, configuration data for operations of a pipeline.

The machine-learning module 220 trains a machine-learning model to generate frameworks configuration data based on operation configuration data. For example, the machine-learning model may be trained using operation and framework configuration data created by human experts. Thereafter, the machine-learning model may receive operation configuration data as input and generate framework configuration data as output. The machine-learning model may be a large language model (LLM) that takes text input and generates text output. LLMs perform natural language processing (NLP). Input text is mapped to vectors in a high-dimensional space (e.g., vectors of hundreds or thousands of elements) such that words with similar meanings have vectors that are closer together than words with dissimilar meanings. Additionally, relationships between vectors may be maintained. For example, the relationship between the vector for "king" and "queen" may be the same as the relationship between the vector for "man" and "woman." Thus, manipulation of vectors may have semantic meaning when the vectors are converted back to human-readable language.

Alternatively, the configuration data may be input and output in a structured format. For example, a vector may be used for input and output, with each position of the vector storing a specific parameter value. A convolutional neural network (CNN) may be used for vector processing.

The configuration module 230 generates configuration data for resources used in executing a pipeline. In some example embodiments, the configuration data is generated by the machine-learning module 220 and the configuration module 230 generates a file based on the output of the machine-learning module 220. Alternatively, the configuration module 230 may generate the configuration data using scripts.

A user interface for configuring the pipeline configuration server 140, for providing a pipeline configuration, for managing the machine-learning model, or any suitable combination thereof may be provided by the pipeline configuration server 140 (or an application server 130) using the user interface module 240. For example, a hypertext markup language (HTML) document may be generated by the user interface module 240, transmitted to a client device 160 by the communication module 210, and rendered on a display device of the client device 160 by a web browser executing on the client device 160. The user interface may comprise text fields, drop-down menus, and other input fields. For example, the user may be provided a file upload widget chat interface to select and upload a pipeline configuration file.

Pipeline configuration data, framework configuration data, machine-learning models, training data, or any suitable combination thereof may be stored and accessed by the storage module 250. For example, local storage of the pipeline configuration server 140, such as a hard drive, may be used. As another example, network storage may be accessed by the storage module 250 via the network 190.

Figure 3:
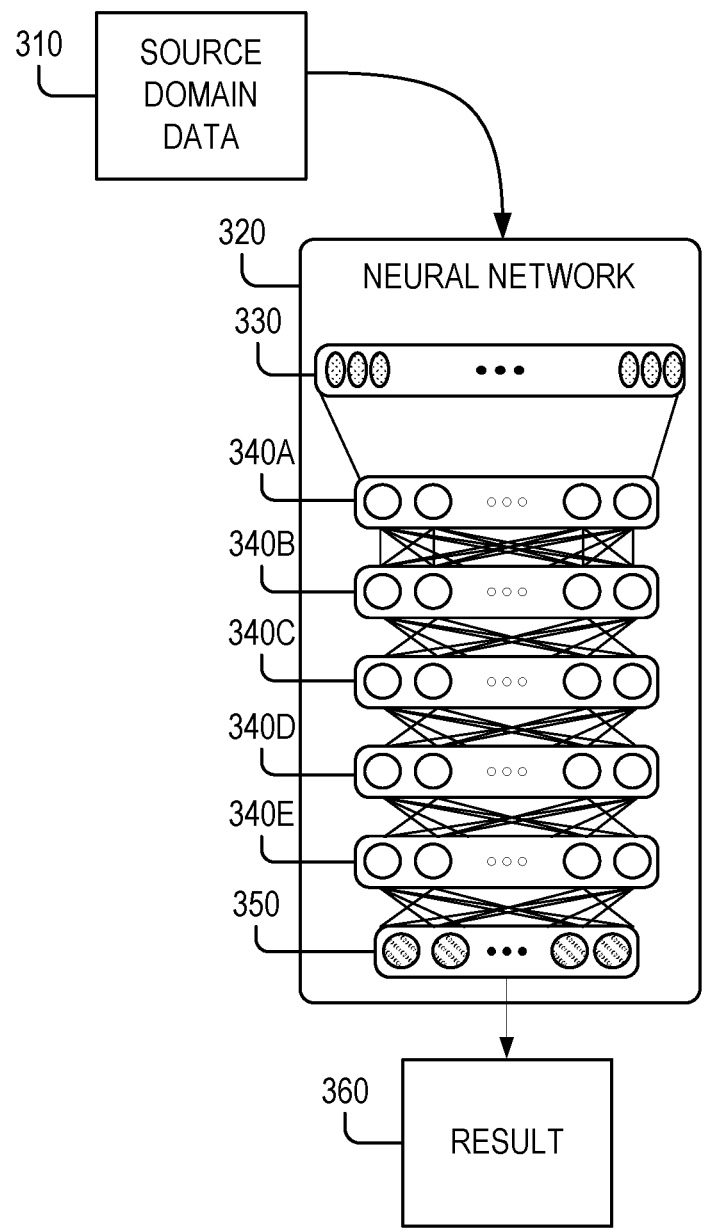
FIG. 3 is a block diagram of a neural network, suitable for use in pipeline configuration support, according to some example embodiments.

FIG. 3 is a block diagram of a neural network 320, suitable for use in pipeline configuration support, according to some example embodiments. The neural network 320 takes source domain data 310 as input and processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. In some example embodiments, the number of epochs is 10, 100, 500, or 1000. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

The neural network 320 may be a deep learning neural network, a deep convolutional neural network, a recurrent neural network, a transformer neural network, or another type of neural network. A neuron is an architectural element used in data processing and artificial intelligence, particularly machine learning. A neuron implements a transfer function by which a number of inputs are used to generate an output. In some example embodiments, the inputs are weighted and summed, with the result compared to a threshold to determine if the neuron should generate an output signal (e.g., a 1) or not (e.g., a 0 output). The inputs of the component neurons are modified through the training of a neural network. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input. Thus, the coefficients assign significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some example embodiments, the structure of each layer is predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNNs, genetic or evolutionary algorithms, and the like.

With the help of natural language processing (NLP) and advanced data pre-processing, a machine learning model (e.g., the neural network 320) can be trained on all historical (existing) business entities (for instance, incidents, email interactions, etc.) from the system to assign them with a certain set of keywords or a dominant topic label based on textual fields such as description, subject, and so forth.

A topic label can be a human-readable phrase or word specific to the industry that it belongs to. It can be determined based on a set of keywords. For instance, if an object contains a long text of multiple words, this model will detect the most "relevant" and "important" keywords and assign them to different ensembles based on multiple factors. Some factors include feature importance and linguistic proximity. Feature importance is an NLP technique used to determine the most important and relevant textual fields provided from an input. Linguistic proximity refers to a distance between vector representations of keywords in two (or more) textual inputs. Additional factors include word commonalities, n-gram commonalities, and the like.

Related data objects may be assigned a human-legible "topic." Based on the existing topics and the contents of a new data object, the new data object is automatically assigned to one of the existing topics.

The transformer architecture processes an entire input at once rather than sequentially. For example, a RNN processes words or sentences sequentially, with the output of the RNN treated as an input for each input after the first (thus the use of the word "recurrent" in the name). As a result, relationships between elements that are far apart in the input are difficult to detect. The transformer architecture receives a larger input and learns the interrelationships between the elements and the output using an attention mechanism. Since all elements are processed together, distance between the elements of the input does not affect the learning process.

The neural network 320 may be used for pipeline configuration support by training with source domain data 310 comprising pipeline configuration data as input and framework configuration data as the label for the input. The trained neural network 320 will then generate framework configuration data as the result 360 based on new pipeline configuration data.

Figure 4:
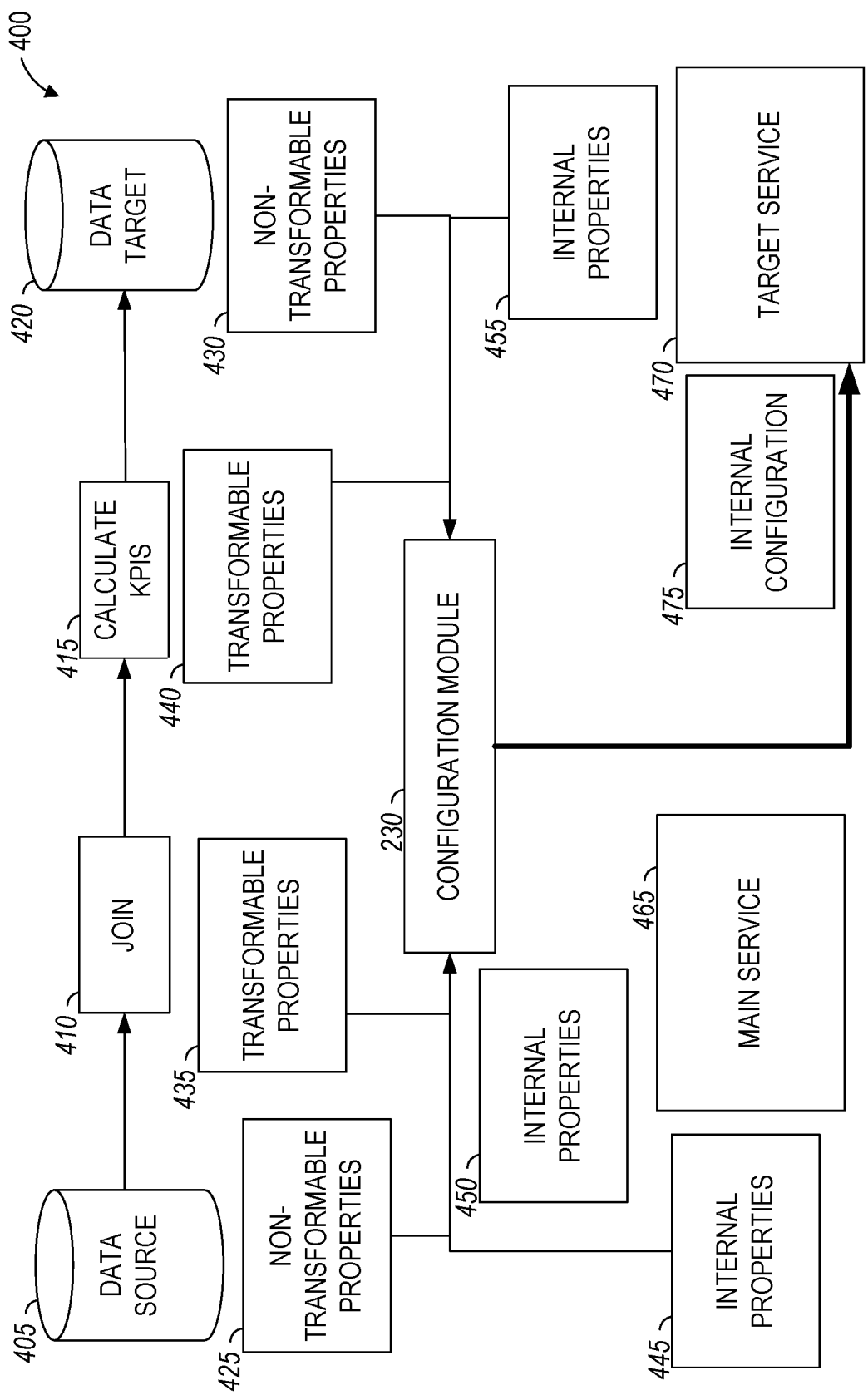
FIG. 4 is a block diagram illustrating a pipeline configuration process, according to some example embodiments.

FIG. 4 is a block diagram illustrating a pipeline configuration process 400, according to some example embodiments. The pipeline configuration process 400 includes three phases: initial configuration, pipeline deployment and monitoring. Each phase is executed sequentially and has a significant impact on the next. In the example of FIG. 4, the pipeline includes operations 410 and 415. The operation 410 operates on data from a data source 405. The operation 415 receives the data generated by the operation 410 and generates output in the data target 420.

In the initial configuration phase, operation configurations are set. For example, the non-transformable properties 425 may be set for the data source 405; the transformable properties 435 may be set for the operation 410; the transformable properties 440 may be set for the operation 415; and the non-transformable properties 430 may be set for the data target 420. The setting of the properties may be performed independently and at different times. For example, internal properties 445 for the main service 465 and internal properties 450 for the configuration module 230 may be set at the service's deployment time using configuration files. The configuration files may contain the typical and default properties for all uses of the main service 465 and the configuration module 230. For particular uses, the default properties may be overridden.

The non-transformable properties 425-430 and the transformable properties 435-440 may be set at the pipeline's design time. Properties for data sources (e.g., the data source 405) and data targets (e.g., the data target 420) may be set up prior to the design time. For example, if many pipelines use the same sources and targets, properties may be reused.

Some configurations may be derived from other configurations or may be calculated. For example, properties identifying source data volume or available cluster resources may be generated at the start of the pipeline deployment phase.

After the initial configuration is complete, the pipeline may be scheduled or executed, which begins the pipeline deployment phase. The configurations (e.g., the non-transformable properties 425-430, the transformable properties 435-440, and the internal properties 445-450) are provided to the configuration module 230. The configuration module 230 generates the internal configuration 475 by copying the provided configurations, considering relevant properties, and overwriting one or more properties to better tune the pipeline execution. The internal properties 445 for the configuration module 230 may set different goals for execution. For example, the internal properties 445 may indicate whether the configuration module 230 is tuning for performance boost, cost optimization, consumption of no more than a fixed amount of resources, completion of the pipeline by a certain time, or any suitable combination thereof. After the internal configuration 475 is created, the process begins execution by the target service 470.

The configuration module 230 may be supported by one or more trained machine-learning models. A different training set may be used for each of the different strategies. For example, a first training set may be used to train a first machine-learning model to perform cost optimization and a second training set may be used to train a second machine-learning model to generate the internal configuration 475 for a performance boost. To protect users of the configuration module 230, training and optimization of the machine-learning models may be performed before deployment.

Training machine-learning models uses large amounts of annotated training data. A script-based transformation algorithm may be used initially, and replaced by one or more trained machine-learning models after training and testing is complete. The inputs to and outputs generated by the script-based transformation algorithm may be used as training data. Additionally, a test platform may be used to generate more test cases and data.

The monitoring phase can provide valuable information that can help improve the algorithm or its available tunings and configurations. Furthermore, if machine learning algorithms are used, monitored values can be used to feed them which will allow the transformation to be automatically tuned to provide better results.

Figure 5:
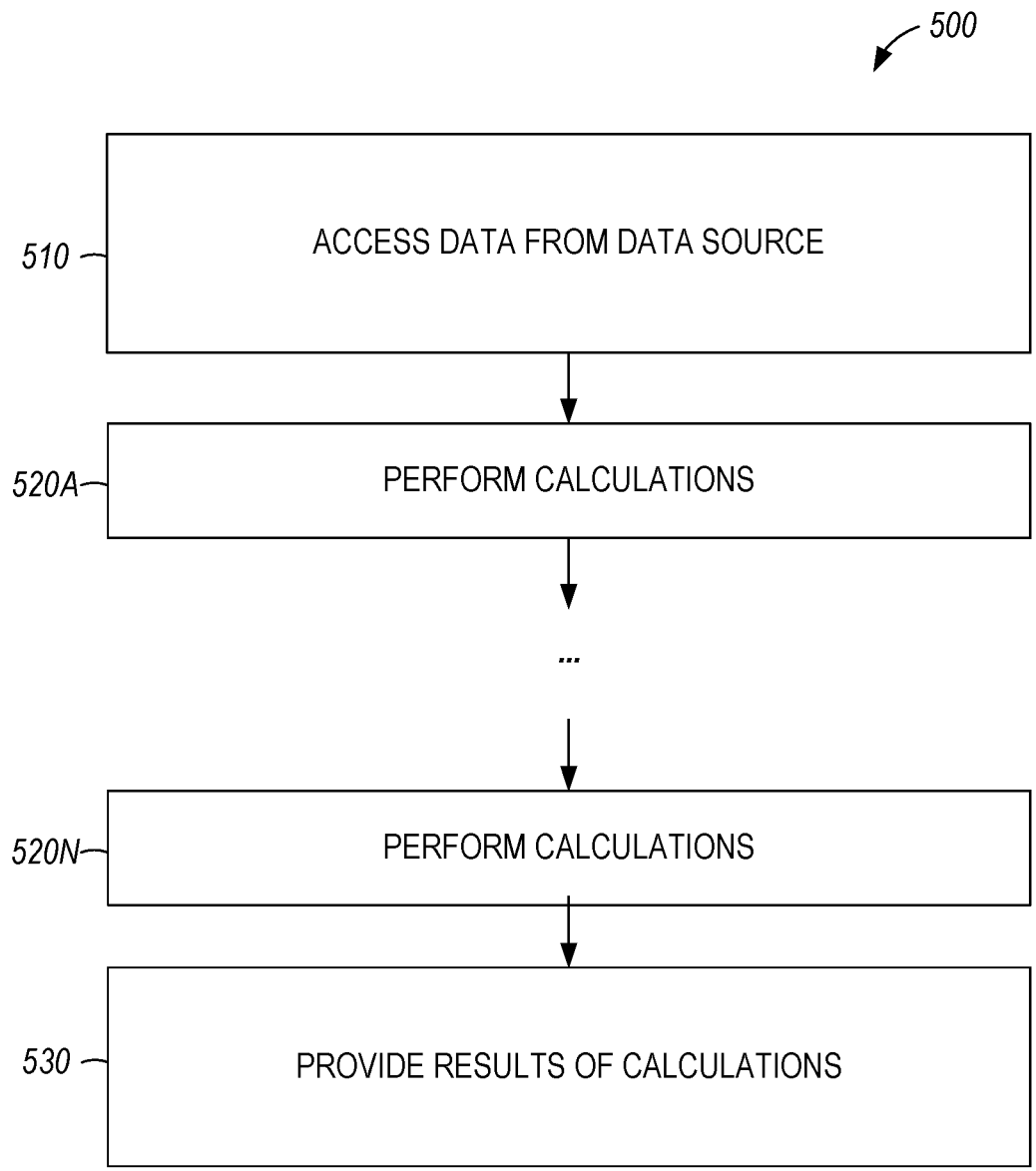
FIG. 5 is a flowchart illustrating an example pipeline.

FIG. 5 is a flowchart illustrating an example pipeline 500. The pipeline 500 includes operations 510, 520A-520N, and 530. By way of example and not limitation, the pipeline 500 may be performed by application servers 130 of the data center 120 as shown in FIG. 1.

Operation 510 accesses data from a data source, such as the database server 150 of FIG. 1. As an example, employee and expense data may be accessed in operation 510. Configuration data for operation 510 may identify the data source, the data to be accessed (e.g., by providing an SQL query), a maximum acceptable cost for performing the operation, a maximum acceptable time for performing the operation, a volume of the data to be accessed, or any suitable combination thereof.

The pipeline continues with operation 520A, which performs calculations on the accessed data. For example, key performance indicators (KPIs) may be calculated using the accessed data by executing a set of instructions, by providing the accessed data to a trained machine-learning model, or any suitable combination thereof. Continuing with the example above, the pipeline may determine costs on a per-department or per-customer basis in operation 520A. Configuration data for operation 520A may identify the calculations to be performed, a maximum acceptable cost for performing the operation, a maximum acceptable time for performing the operation, or any suitable combination thereof. Any number of additional operations 520B-520N may also be performed. For example, data may be accessed in operation 510. The accessed data may be aggregated in operation 520A. The aggregated data may be analyzed in operation 520B, and so on before the results are provided in operation 530. Each of the operations 520A-520N may have its own characteristics and configurations.

In operation 530, the results of the calculations are provided. For example, the results may be transmitted via the network 190 to the client device 160A, both of FIG. 1.

Figure 6:
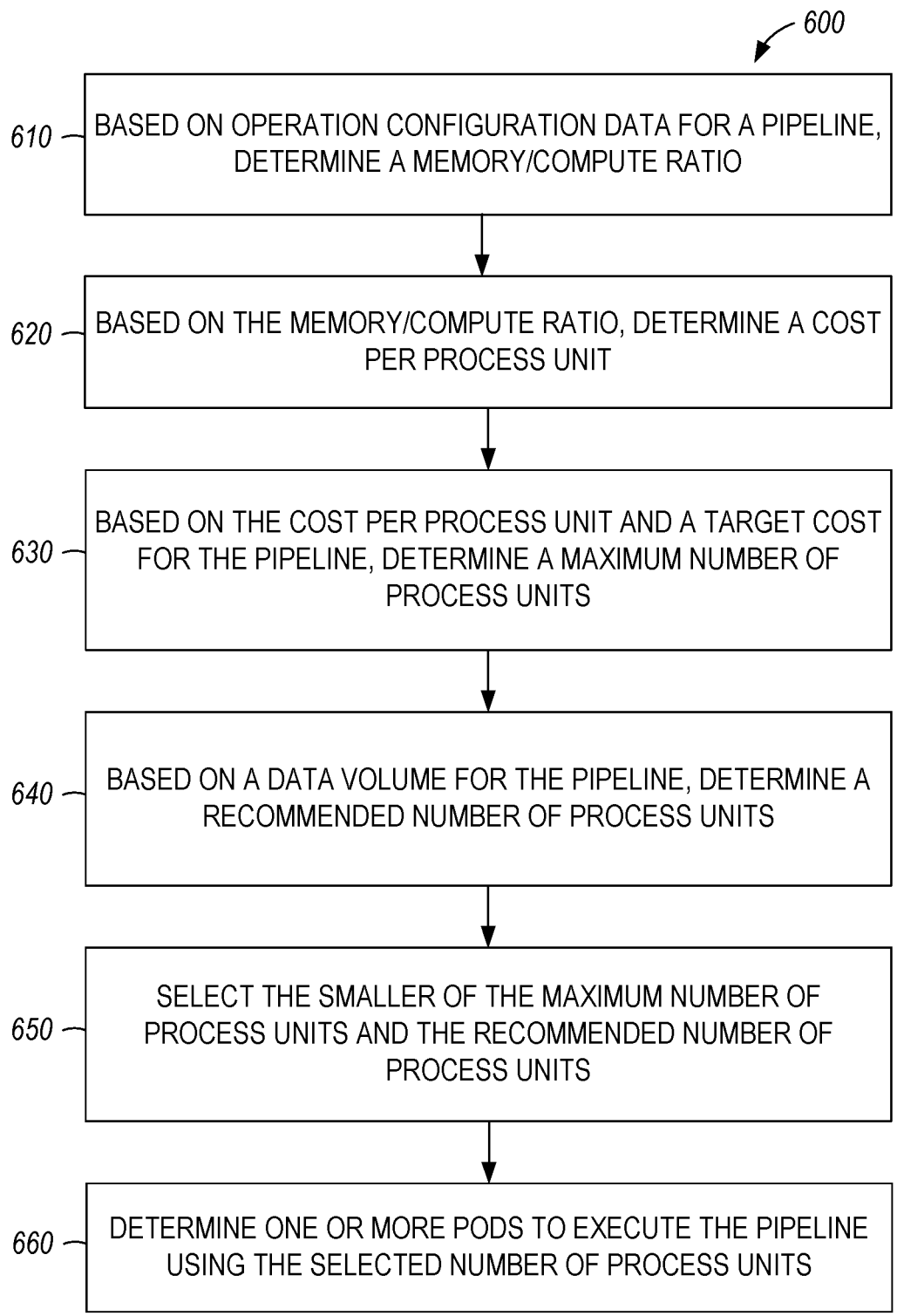
FIG. 6 is a flowchart illustrating operations of an example method suitable for pipeline configuration support.

FIG. 6 is a flowchart illustrating operations of an example method 600 suitable for pipeline configuration support. The method 600 includes operations 610, 620, 630, 640, 650, and 660. By way of example and not limitation, the method 600 may be performed by the modules of the pipeline configuration server 140 using the neural network 320 as shown in FIGS. 1-3.

In operation 610, based on operation configuration data for a pipeline, the configuration module 230 determines a memory/compute ratio (e.g., measured in GB/processor core). For example, an operation that includes a lengthy series of calculations on a relatively small amount of data, such as encryption, would have a low memory/compute ratio. As another example, an operation that performs a join operation on a large volume of data would have a high memory/compute ratio. The memory/compute ratio may be determined by using a trained machine-learning model that learns from the execution of past pipelines.

Based on the memory/compute ratio, the configuration module 230 determines a cost per process unit (operation 620). For example, if each process unit provides a fixed amount of computation power, the cost per process unit will be higher when more memory is used for the process units. The cost may be determined based on an estimated time to perform the operation (e.g., 1 hour) and a cost to rent a processor core for that duration of time.

In operation 630, based on the cost per process unit and a target cost for the pipeline, the configuration module 230 determines a maximum number of process units. For example, if each process unit costs $10 and the target cost for the pipeline is $100, the maximum number of process units would be 10.

Based on a data volume for the pipeline, the configuration module 230 determines a recommended number of process units (operation 640). For example, if the pipeline has a data volume of 500 GB, a trained machine-learning model may determine that the recommended number of process units is 5. In some example embodiments, the recommended number of process units is the number of process units at which adding additional process units does not reduce the time to complete the pipeline. Operations 630 and 640 may be performed in parallel.

In operation 650, the configuration module 230 selects the smaller of the maximum number of process units and the recommended number of process units. Continuing with the example above, the selected number of process units would be 5. Since the selected number is lower than the maximum number determined based on the target cost, the cost for the pipeline will be lower than the amount specified in the operation configuration data.

The configuration module 230, in operation 660, determines one or more pods to execute the pipeline using the selected number of process units. For example, a first pod of 4 process units and a second pod of 1 process unit may be assigned to execute the pipeline. Distributing the process units among multiple machines may reduce costs. For example, the cost to use a high-end sixteen-core machine may be higher than the cost to use four four-core machines.

In some example embodiments, operation 630 or 680 is repeated for multiple cloud computing providers. For example, if one provider has a lower cost per processor and a higher cost per unit memory than another provider, the selection of a lower-cost provider will depend on the memory/compute ratio. Thus, operation 630 may be repeated for each provider and a different maximum number of process units may be determined for each provider. Additionally or alternatively, having selected the number of process units to use in operation 650, the determining of the pods to execute the pipeline in operation 660 may select a lowest-cost provider.

Figure 7:
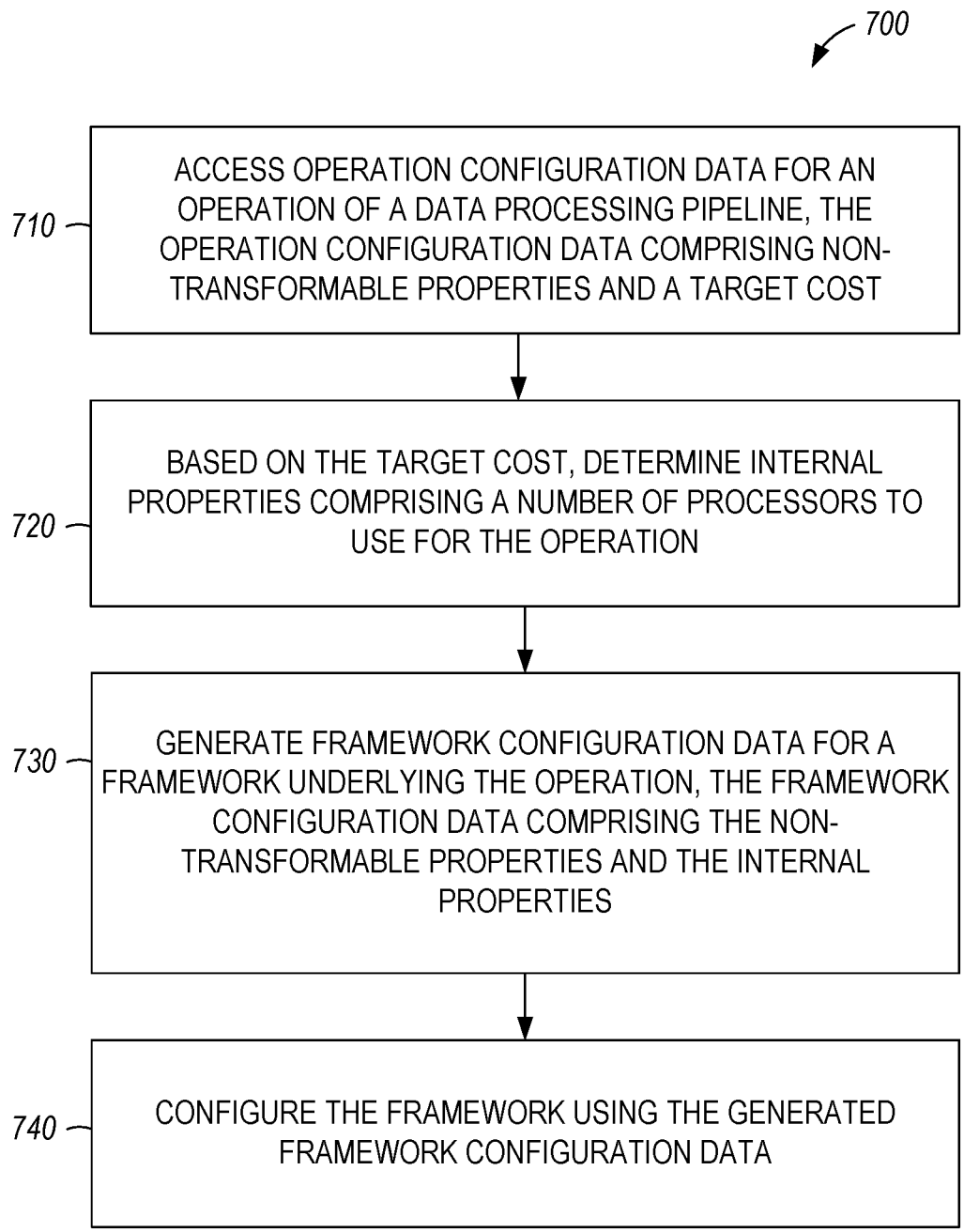
FIG. 7 is a flowchart illustrating operations of an example method suitable for pipeline configuration support.

FIG. 7 is a flowchart illustrating operations of an example method 700 suitable for pipeline configuration support. The method 700 includes operations 710, 720, 730, and 740. By way of example and not limitation, the method 700 may be performed by the modules of the pipeline configuration server 140 using the neural network 320 as shown in FIGS. 1-3.

In operation 710, the pipeline configuration server 140 accesses operation configuration data for an operation of a data processing pipeline. The operation configuration data comprises non-transformable properties and a target cost. For example, the operation may be a data accessing operation. The operation configuration data may include an identifier of the data source or a data source location and credentials used to access the data source. These are non-transformable properties that will be used without modification. Changing these properties would cause the operation to access different data than is intended or to fail to access data. The operation configuration data may also include a target cost (e.g., a target total cost or a target cost per unit time) that can be used by the pipeline configuration server 140 to determine an amount of computing resources (e.g., processor cores, memory, or network bandwidth) to be allocated to the operation.

Additionally or alternatively, the operation configuration data may include a resource cost list, a time constraint, a region constraint, or any suitable combination thereof. A resource cost list identifies costs for computing resources that are used for implementing the operation. For example, the resource cost list may include a price per hour per processor, core, node, GPU, unit of memory, or any suitable combination thereof. A time constraint identifies a maximum amount of time for the operation to complete, a deadline by which the operation is to be completed, an earliest time to begin the operation, or any suitable combination thereof. A region constraint identifies one or more regions that are authorized for the operation (e.g., a passlist of acceptable regions), one or more regions that are not authorized for the operation (e.g., a banlist of unacceptable regions), or both. For example, national regulations may require that data regarding citizens of the nation be processed within the nation or not be provided to a particular nation. The region constraint may be provided to comply with the national regulations. Alternatively, to reduce network transit time, the region constraint may be set to ensure that the operation is performed within a certain geographic distance of other operations in the pipeline.

At least a portion of the operation configuration data may be selected via a user interface. For example, a graphical user interface may be presented that allows the pipeline developer to select from a set of configuration options such as performance boost or cost optimized. Additional options may be presented that allow the pipeline developer to set fixed resources to use, to identify a maximum cost for the pipeline or an individual operation, to specify a maximum time to perform the pipeline or an individual operation, or any suitable combination thereof. The graphical user interface may generate a configuration file (e.g., a YAML file) that associates the selections made with an operation or the pipeline.

The pipeline configuration server 140, in operation 720, determines internal properties comprising a number of processors to use for the operation based on the target cost. For example, based on a target cost per hour and a per-processor price per hour, the pipeline configuration server 140 can determine a maximum number of processors to assign to the operation. In addition to or instead of the internal properties comprising a number of general-purpose processors (e.g., CPUs), the internal properties may comprise an amount of graphics processing unit (GPU) resources, data storage resources (e.g., hard disk, solid-state drive (SSD), or database space), memory resources (e.g., GBs of RAM), or any suitable combination thereof to use for the operation. In more complex scenarios, such as when processors and memory are independently paid for but a single target cost is provided, at least a subset of the operation configuration data may be provided as input to a trained machine-learning model. The determining of the internal properties may also be based on the resource cost list, the time constraint, the region constraint, or any suitable combination thereof. The trained machine-learning model generates as output values for a number of internal properties.

The internal properties may also include a number of pods or nodes to use for the operation. A pod is a group of one or more containers in a containerized execution environment, such as Kubernetes. The containers in a pod share computing resources, run in a shared context, and are co-located. A (computing) node is a physical or virtual machine on which one or more pods are run. With reference to FIG. 3, the term "node" may refer to a computing node or a neural network node, depending on context. An operation or framework relating to machine-learning models could comprise an internal property relating to the number of neural network nodes to use, relating to the complexity of the machine-learning model, relating to the number of computing nodes to use, relating to the number of computers to be used in training or using the machine-learning model, or any suitable combination thereof.

In operation 730, the pipeline configuration server 140 generates framework configuration data for a framework underlying the operation, the framework configuration data comprising the non-transformable properties and the internal properties. For example, the framework configuration data may include an identifier of a data source, credentials to access the data source, a number of processors to use for the operation of accessing the data source, and the like.

The pipeline configuration server 140 configures the framework using the generated framework configuration data (operation 740). For example, the framework configuration data may be stored in a data object or a file and the data object or file provided to the framework. As another example, the framework configuration data may be provided as command-line arguments when invoking the framework. Based on the configuration data, the framework is configured to operate according to the non-transformable properties and the internal properties.

The method 700 may be performed in response to a request from a user of a client device 160 to deploy the network-based application 110 using a pipeline of operations. By use of the method 700, automatic configuration of frameworks used by operations is performed, reducing the level of effort required by the user, increasing the efficiency of resource usage by the operations, or both.

The results generated using framework configuration determined using the method 700 may be monitored to provide feedback to the configuration module 230. For example, a user-specified memory/compute ratio may be observed to perform more efficiently than a machine-learning model-determined memory/compute ratio. By adding this result to the training data for the machine-learning model, future recommendations by the machine-learning model are improved. Alternatively, the feedback may be addressed manually or by automatically setting rules to be applied by the configuration module 230 in the future.

Figure 8:
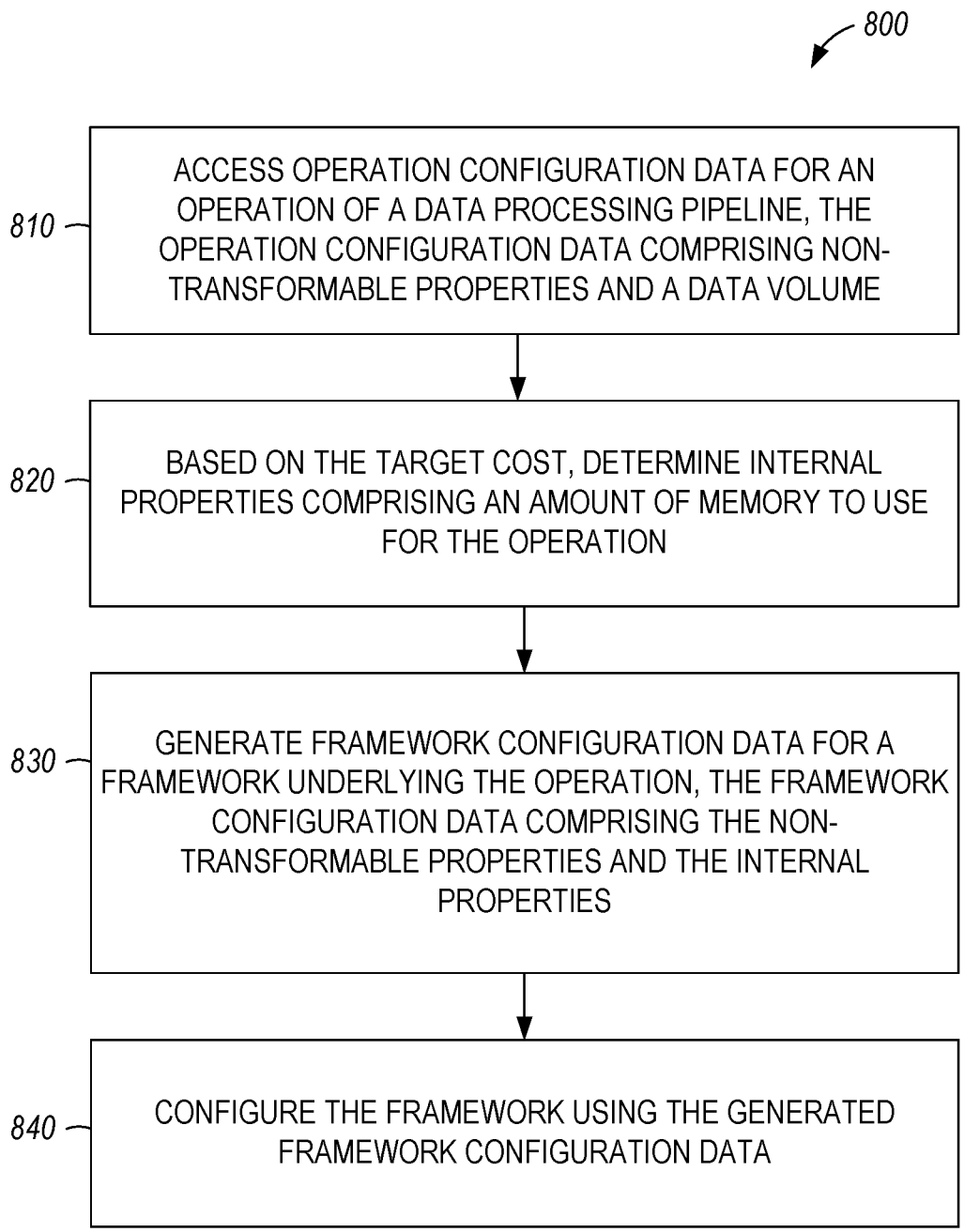
FIG. 8 is a flowchart illustrating operations of an example method suitable for pipeline configuration support.

FIG. 8 is a flowchart illustrating operations of an example method 800 suitable for pipeline configuration support. The method 800 includes operations 810, 820, 830, and 840. By way of example and not limitation, the method 800 may be performed by the modules of the pipeline configuration server 140 using the neural network 320 as shown in FIGS. 1-3.

In operation 810, the pipeline configuration server 140 accesses operation configuration data for an operation of a data processing pipeline. The operation configuration data comprises non-transformable properties and a data volume. For example, the operation may be a data accessing operation. The operation configuration data may include an identifier of the data source and credentials used to access the data source. These are non-transformable properties that will be used without modification. Changing these properties would cause the operation to access different data than is intended or to fail to access data. The operation configuration data may also include a data volume (e.g., a number of gigabytes of data that will be accessed by the operation). The data volume can be used by the pipeline configuration server 140 to determine an amount of computing resources (e.g., processor cores, memory, or network bandwidth) to be allocated to the operation.

The pipeline configuration server 140, in operation 820, determines internal properties comprising an amount of memory to use for the operation based on the data volume. For example, based on a heuristic that provides a ratio between total data volume and working memory used, the pipeline configuration server 140 can determine an amount of memory to assign to the operation. In more complex scenarios, such as when a target cost is also provided, at least a subset of the operation configuration data may be provided as input to a trained machine-learning model. The trained machine-learning model generates as output values for a number of internal properties.

In operation 830, the pipeline configuration server 140 generates framework configuration data for a framework underlying the operation, the framework configuration data comprising the non-transformable properties and the internal properties. For example, the framework configuration data may include an identifier of a data source, credentials to access the data source, a number of processors to use for the operation of accessing the data source, an amount of memory to use for the operation, and the like.

The pipeline configuration server 140 configures the framework using the generated framework configuration data (operation 840). For example, the framework configuration data may be stored in a data object or a file and the data object or file provided to the framework. Based on the configuration data, the framework is configured to operate according to the non-transformable properties and the internal properties.

The method 800 may be performed in response to a request from a user of a client device 160 to deploy the network-based application 110 using a pipeline of operations. By use of the method 800, automatic configuration of frameworks used by operations is performed, reducing the level of effort required by the user, increasing the efficiency of resource usage by the operations, or both.

Figure 9:
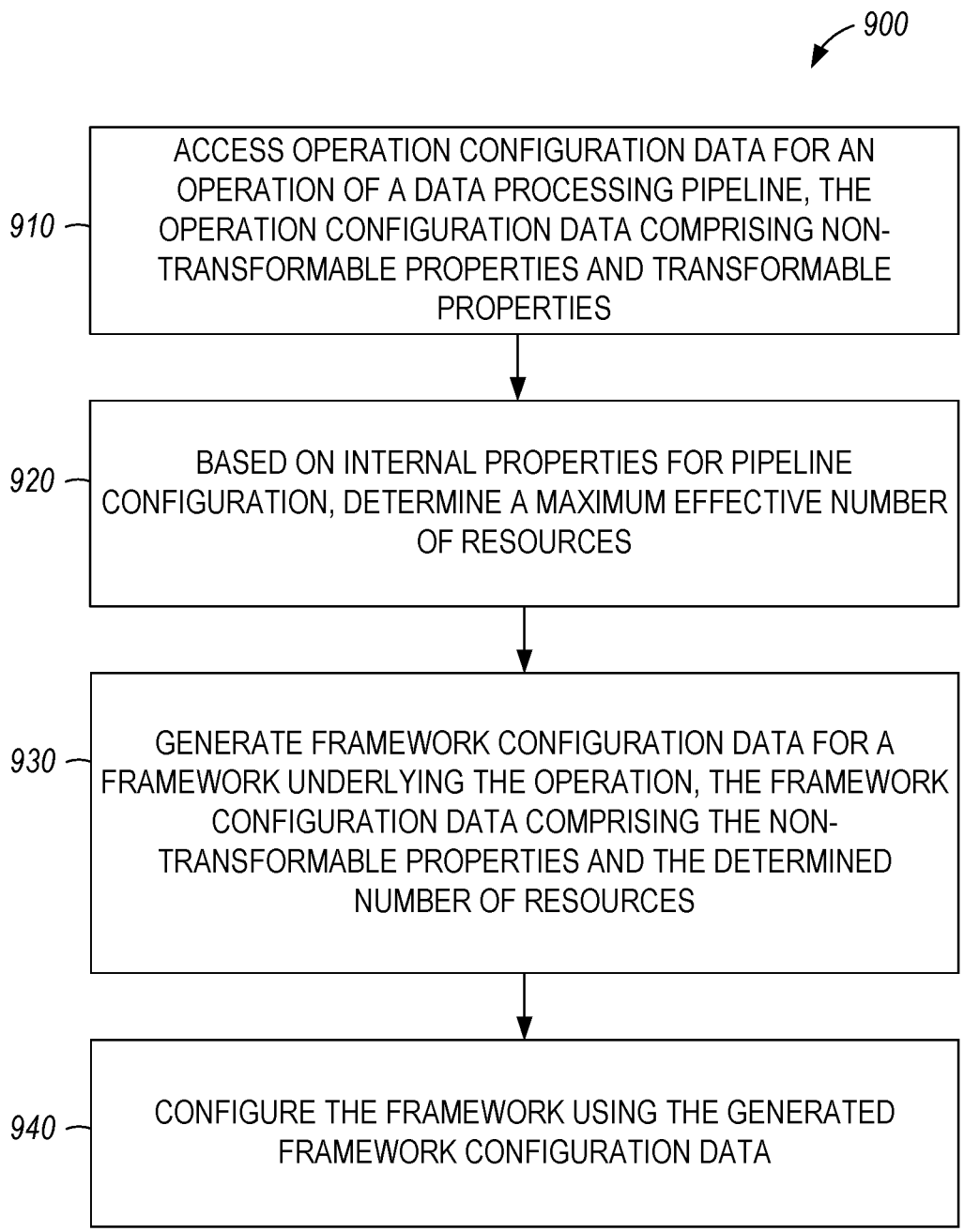
FIG. 9 is a flowchart illustrating operations of an example method suitable for pipeline configuration support.

FIG. 9 is a flowchart illustrating operations of an example method 900 suitable for pipeline configuration support. The method 800 includes operations 910, 920, 930, and 940. By way of example and not limitation, the method 900 may be performed by the modules of the pipeline configuration server 140 using the neural network 320 as shown in FIGS. 1-3.

In operation 910, the pipeline configuration server 140 accesses operation configuration data for an operation of a data processing pipeline. The operation configuration data comprises non-transformable properties and transformable properties. For example, the operation may be one of the operations described above with respect to FIGS. 5-7.

The configuration module 230, in operation 920, determines a maximum effective number of resources for the pipeline. For example, the configuration module 230 may determine that using more processors increases performance of the pipeline as the number of processors is increased from one to sixteen, but that adding further processors does not further increase the performance of the pipeline.

In operation 930, the configuration module 230 generates framework configuration data for a framework underlying the operation, the framework configuration data comprising the non-transformable properties and the determined number of resources. The pipeline configuration server 140 configures the framework using the generated framework configuration data (operation 940). For example, the framework configuration data may be stored in a data object or a file and the data object or file provided to the framework. Based on the configuration data, the framework is configured to operate according to the non-transformable properties and the determined number of resources.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors coupled to the memory and configured to execute the instructions to perform operations comprising: accessing operation configuration data for an operation of a data processing pipeline, the operation configuration data comprising non-transformable properties and a target cost; based on the target cost, determining internal properties comprising a number of processors to use for the operation; generating framework configuration data for a framework underlying the operation, the framework configuration data comprising the non-transformable properties and the internal properties; and configuring the framework using the generated framework configuration data.

In Example 2, the subject matter of Example 1, wherein: the operation configuration data further comprises a data volume; and the determining of the internal properties is further based on the data volume.

In Example 3, the subject matter of Examples 1-2, wherein: the operation configuration data further comprises a resource cost list; and the determining of the internal properties is further based on the resource cost list.

In Example 4, the subject matter of Examples 1-3, wherein the non-transformable properties comprise credentials.

In Example 5, the subject matter of Examples 1-4, wherein the non-transformable properties comprise a data source location.

In Example 6, the subject matter of Examples 1-5, wherein: the operation configuration data further comprises a time constraint; and the determining of the internal properties is further based on the time constraint.

In Example 7, the subject matter of Examples 1-6, wherein: the operation configuration data further comprises a region constraint; and the determining of the internal properties is further based on the region constraint.

In Example 8, the subject matter of Examples 1-7, wherein the internal properties further comprise an amount of memory to use for the operation.

In Example 9, the subject matter of Examples 1-8, wherein the internal properties further comprise a number of pods to use for the operation.

In Example 10, the subject matter of Examples 1-9, wherein the internal properties further comprise an amount of graphics processing unit (GPU) resources to use for the operation.

In Example 11, the subject matter of Examples 1-10, wherein: the framework is a first framework; the framework configuration data is first framework configuration data; and the operations further comprise: based on the operation configuration data, generating second framework configuration data for a second framework; based on a comparison of the first framework configuration data with the second framework configuration data, selecting the first framework to underly the operation.

In Example 12, the subject matter of Examples 1-11, wherein the determining of the internal properties comprises providing at least a portion of the operation configuration data to a trained machine-learning model.

Example 13 is a non-transitory computer-readable medium that stores instructions that, when executed by one or more processors, cause the one or more processors to perform operations comprising: accessing operation configuration data for an operation of a data processing pipeline, the operation configuration data comprising non-transformable properties and a target cost; based on the target cost, determining internal properties comprising a number of processors to use for the operation; generating framework configuration data for a framework underlying the operation, the framework configuration data comprising the non-transformable properties and the internal properties; and configuring the framework using the generated framework configuration data.

In Example 14, the subject matter of Example 13, wherein: the operation configuration data further comprises a data volume; and the determining of the internal properties is further based on the data volume.

In Example 15, the subject matter of Examples 13-14, wherein: the operation configuration data further comprises a resource cost list; and the determining of the internal properties is further based on the resource cost list.

In Example 16, the subject matter of Examples 13-15, wherein the non-transformable properties comprise credentials.

In Example 17, the subject matter of Examples 13-16, wherein the non-transformable properties comprise a data source location.

Example 18 is a method comprising: accessing, by one or more processors, operation configuration data for an operation of a data processing pipeline, the operation configuration data comprising non-transformable properties and a target cost; based on the target cost, determining internal properties comprising a number of processors to use for the operation; generating, by the one or more processors, framework configuration data for a framework underlying the operation, the framework configuration data comprising the non-transformable properties and the internal properties; and configuring, by the one or more processors, the framework using the generated framework configuration data.

In Example 19, the subject matter of Example 18, wherein: the operation configuration data further comprises a time constraint; and the determining of the internal properties is further based on the time constraint.

In Example 20, the subject matter of Examples 18-19, wherein: the operation configuration data further comprises a region constraint; and the determining of the internal properties is further based on the region constraint.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 10:
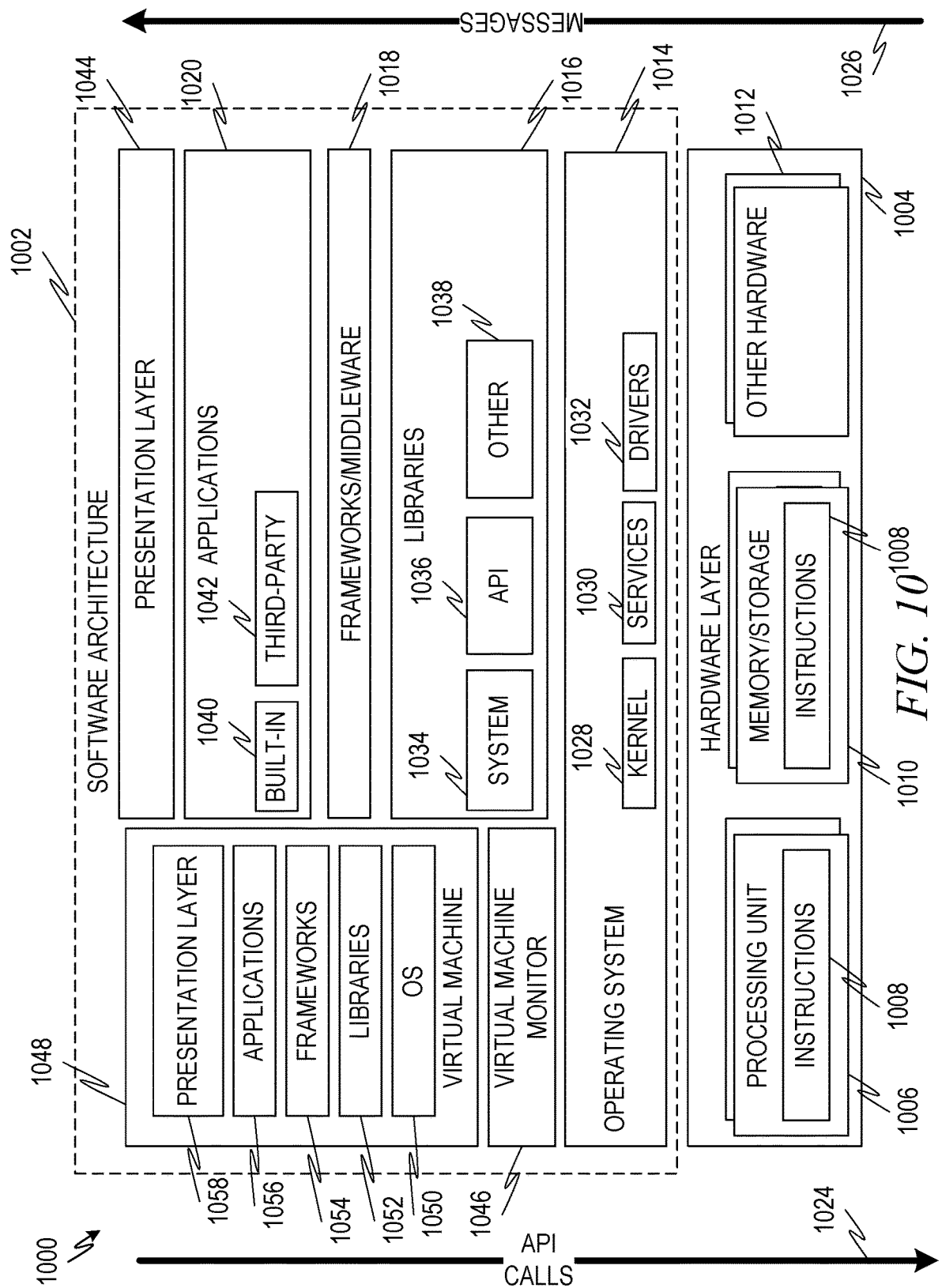
FIG. 10 is a block diagram showing one example of a software architecture for a computing device.

FIG. 10 is a block diagram 1000 showing one example of a software architecture 1002 for a computing device. The software architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 10.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of the software architecture 1002.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the software architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 may provide a higher-level common infrastructure that may be utilized by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system libraries 1034, API libraries 1036, and other libraries 1038), frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 11:
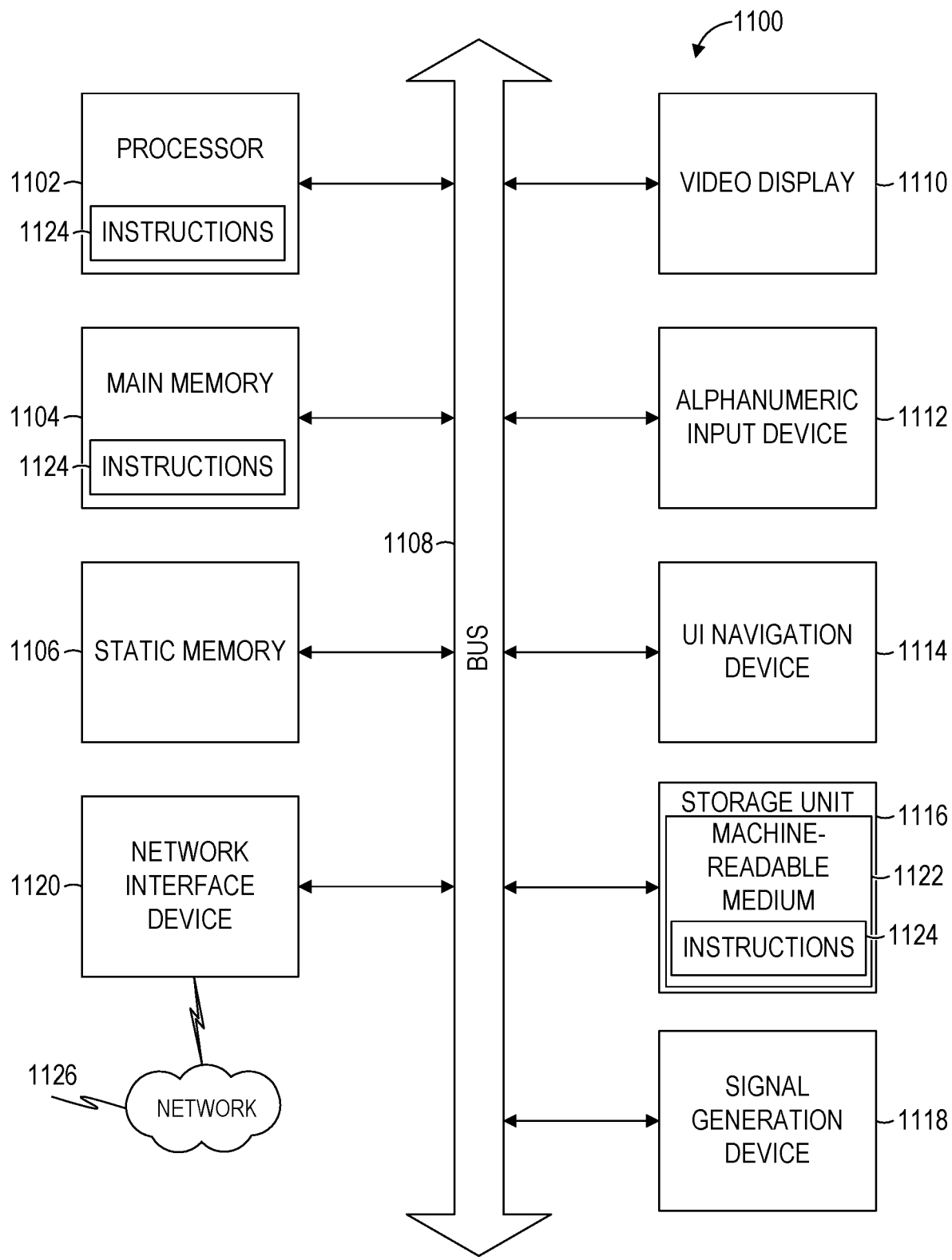
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a storage unit 1116, a signal generation device 1118 (e.g., a speaker), and a network interface device 1120.

Machine-Readable Medium

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting a machine-readable medium 1122.

While the machine-readable medium 1122 is shown in FIG. 11 to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1124 may further be transmitted or received over a communications network 1126 using a transmission medium. The instructions 1124 may be transmitted using the network interface device 1120 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:
   a memory that stores instructions; and
   one or more processors coupled to the memory and configured to execute the instructions to perform operations comprising:
   accessing operation configuration data for an operation of a data processing pipeline, the operation configuration data comprising non-transformable properties and a target cost;
   based on the target cost, determining internal properties comprising a number of processors to use for the operation;
   generating framework configuration data for a framework underlying the operation, the framework configuration data comprising the non-transformable properties and the internal properties; and
   configuring the framework using the generated framework configuration data.

2. The system of claim 1, wherein:
   the operation configuration data further comprises a data volume; and
   the determining of the internal properties is further based on the data volume.

3. The system of claim 1, wherein:
   the operation configuration data further comprises a resource cost list; and
   the determining of the internal properties is further based on the resource cost list.

4. The system of claim 1, wherein the non-transformable properties comprise credentials.

5. The system of claim 1, wherein the non-transformable properties comprise a data source location.

6. The system of claim 1, wherein:
   the operation configuration data further comprises a time constraint; and
   the determining of the internal properties is further based on the time constraint.

7. The system of claim 1, wherein:
   the operation configuration data further comprises a region constraint; and
   the determining of the internal properties is further based on the region constraint.

8. The system of claim 1, wherein the internal properties further comprise an amount of memory to use for the operation.

9. The system of claim 1, wherein the internal properties further comprise a number of pods to use for the operation.

10. The system of claim 1, wherein the internal properties further comprise an amount of graphics processing unit (GPU) resources to use for the operation.

11. The system of claim 1, wherein:
the framework is a first framework;
the framework configuration data is first framework configuration data; and
the operations further comprise:
based on the operation configuration data, generating second framework configuration data for a second framework;
based on a comparison of the first framework configuration data with the second framework configuration data, selecting the first framework to underly the operation.

12. The system of claim 1, wherein the determining of the internal properties comprises providing at least a portion of the operation configuration data to a trained machine-learning model.

13. A non-transitory computer-readable medium that stores instructions that, when executed by one or more processors, cause the one or more processors to perform operations comprising:
accessing operation configuration data for an operation of a data processing pipeline, the operation configuration data comprising non-transformable properties and a target cost;
based on the target cost, determining internal properties comprising a number of processors to use for the operation;
generating framework configuration data for a framework underlying the operation, the framework configuration data comprising the non-transformable properties and the internal properties; and
configuring the framework using the generated framework configuration data.

14. The non-transitory computer-readable medium of claim 13, wherein:
the operation configuration data further comprises a data volume; and
the determining of the internal properties is further based on the data volume.

15. The non-transitory computer-readable medium of claim 13, wherein:
the operation configuration data further comprises a resource cost list; and
the determining of the internal properties is further based on the resource cost list.

16. The non-transitory computer-readable medium of claim 13, wherein the non-transformable properties comprise credentials.

17. The non-transitory computer-readable medium of claim 13, wherein the non-transformable properties comprise a data source location.

18. A method comprising:
accessing, by one or more processors, operation configuration data for an operation of a data processing pipeline, the operation configuration data comprising non-transformable properties and a target cost;
based on the target cost, determining internal properties comprising a number of processors to use for the operation;
generating, by the one or more processors, framework configuration data for a framework underlying the operation, the framework configuration data comprising the non-transformable properties and the internal properties; and
configuring, by the one or more processors, the framework using the generated framework configuration data.

19. The method of claim 18, wherein:
the operation configuration data further comprises a time constraint; and
the determining of the internal properties is further based on the time constraint.

20. The method of claim 18, wherein:
the operation configuration data further comprises a region constraint; and
the determining of the internal properties is further based on the region constraint.

* * * * *